(12) United States Patent
Wang et al.

(10) Patent No.: US 9,465,196 B2
(45) Date of Patent: Oct. 11, 2016

(54) OPTICAL IMAGING LENS AND ELECTRONIC DEVICE COMPRISING THE SAME

(71) Applicants: Kai Lun Wang, Taichung (TW); Long Ye, Taichung (TW); Yanbin Chen, Taichung (TW)

(72) Inventors: Kai Lun Wang, Taichung (TW); Long Ye, Taichung (TW); Yanbin Chen, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 103 days.

(21) Appl. No.: 14/279,337

(22) Filed: May 16, 2014

(65) Prior Publication Data

US 2015/0185438 A1    Jul. 2, 2015

(30) Foreign Application Priority Data

Dec. 30, 2013  (CN) .......................... 2013 1 0746543

(51) Int. Cl.
| | | |
|---|---|---|
| G02B 13/18 | (2006.01) | |
| G02B 3/02 | (2006.01) | |
| G02B 13/00 | (2006.01) | |
| G02B 9/58 | (2006.01) | |
| G02B 9/34 | (2006.01) | |

(52) U.S. Cl.
CPC ............... G02B 13/004 (2013.01); G02B 9/58 (2013.01); G02B 9/34 (2013.01)

(58) Field of Classification Search
CPC ................................ G02B 13/004; G02B 9/34
USPC .................. 359/715, 771–774, 780–783
See application file for complete search history.

(56) References Cited

U.S. PATENT DOCUMENTS

| | | | | |
|---|---|---|---|---|
| 7,474,478 B2* | 1/2009 | Fukuta | ..................... | G02B 9/34 359/715 |
| 7,848,032 B1* | 12/2010 | Chen | ....................... | G02B 9/34 359/715 |
| 8,014,080 B1* | 9/2011 | Chen | ....................... | G02B 9/34 359/644 |
| 8,730,590 B1* | 5/2014 | Tsai | ..................... | G02B 13/004 359/715 |
| 8,941,772 B2* | 1/2015 | Sekine | .................. | G02B 15/14 348/208.11 |
| 2012/0236421 A1* | 9/2012 | Tsai | ..................... | G02B 13/004 359/780 |
| 2014/0078601 A1* | 3/2014 | Hsu | ........................ | G02B 13/00 359/715 |
| 2015/0109686 A1* | 4/2015 | Lee | ..................... | G02B 13/004 359/715 |
| 2015/0185439 A1* | 7/2015 | Gong | .................. | G02B 13/004 348/373 |

FOREIGN PATENT DOCUMENTS

| | | |
|---|---|---|
| JP | 4138552 B2 | 8/2008 |
| TW | 201303352 A1 | 1/2013 |
| TW | 201312151 A1 | 3/2013 |

* cited by examiner

*Primary Examiner* — Thomas K Pham
*Assistant Examiner* — Nicholas R Pasko
(74) *Attorney, Agent, or Firm* — Winston Hsu; Scott Margo

(57) ABSTRACT

An optical imaging lens set includes a first lens element with a concave image-side surface in a vicinity of its periphery, a second lens element with a convex object-side surface in a vicinity of the optical axis and a convex image-side surface in a vicinity of its periphery, a third lens element with positive refractive power, a concave object-side surface in a vicinity of the optical axis and a convex image-side surface in a vicinity of the optical axis and a fourth lens element with a concave image-side surface in a vicinity of the optical axis and a convex image-side surface in a vicinity of its periphery.

19 Claims, 25 Drawing Sheets

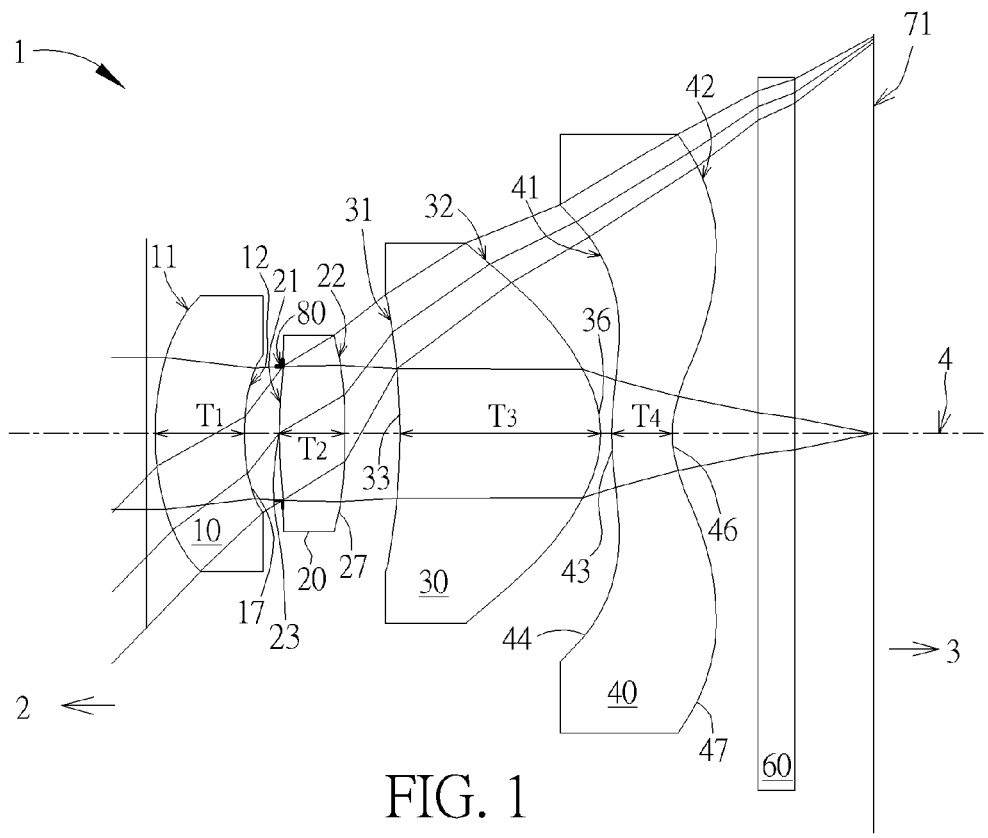
FIG. 1
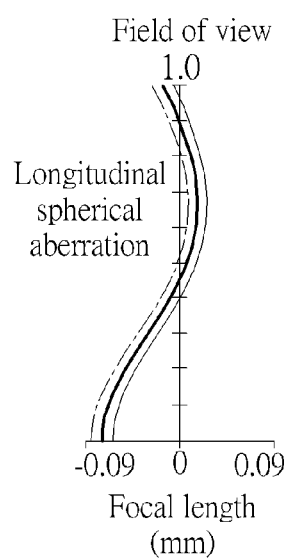
FIG. 2A
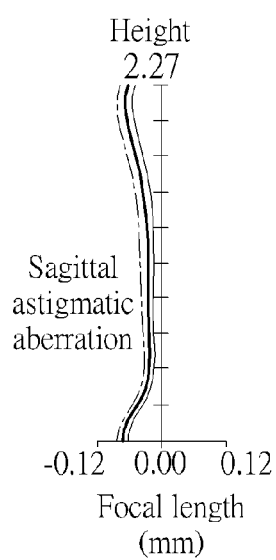
FIG. 2B
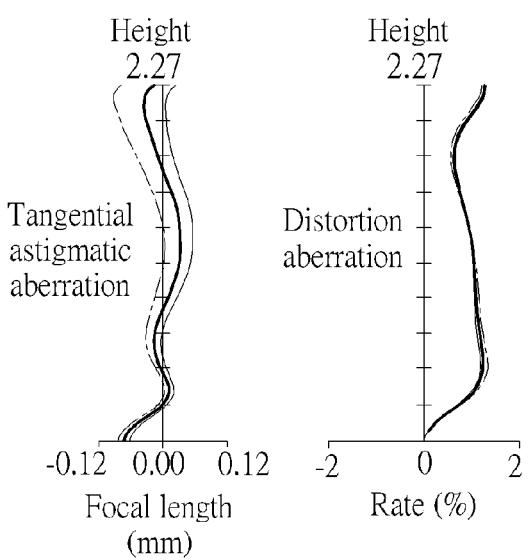
FIG. 2C
FIG. 2D

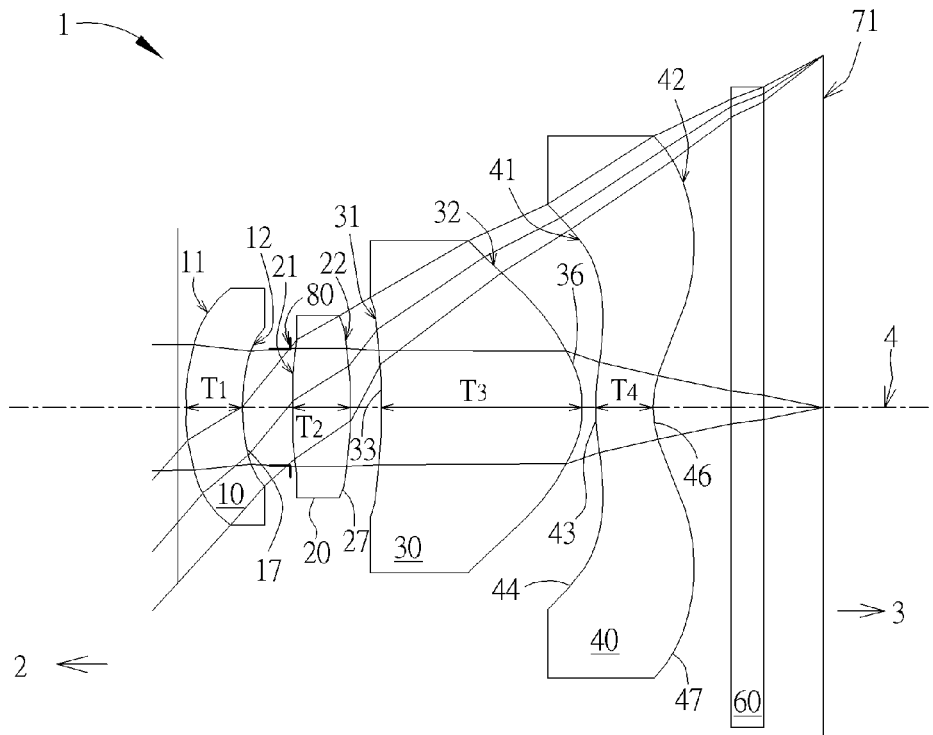
FIG. 13
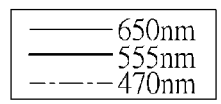
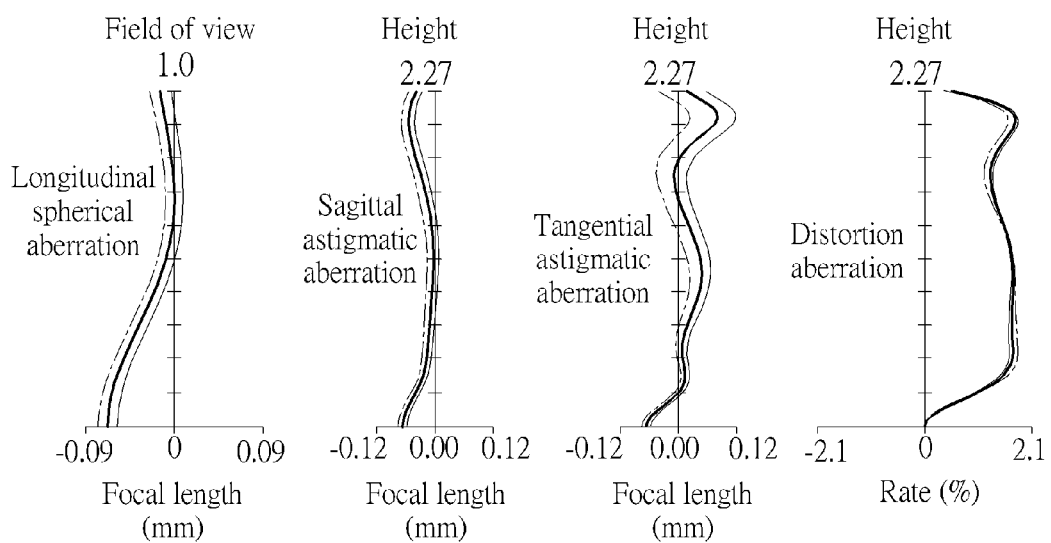
FIG. 14A   FIG. 14B   FIG. 14C   FIG. 14D

| First Example |||||||
|---|---|---|---|---|---|---|
| F=2.004mm, HFOV=47.138deg., Fno=2.40 |||||||
| No. | | Curvature Radius | Ape. Stop Distance Lens Thickness Air Gap | Refractive Index | Abbe No. | Focal Length | Material |
| | Object | Infinite | 500.000 | | | | |
| 11 | First Lens | 1.762 | 0.341 $T_1$ | 1.640 | 23.529 | -83.711 | Plastic |
| 12 | | 1.577 | 0.243 $G_{12}$ | | | | |
| 80 | Ape. Stop | Infinite | 0.008 | | | | |
| 21 | Second Lens | 8.666 | 0.279 $T_2$ | 1.544 | 56.114 | 4.433 | Plastic |
| 22 | | -3.320 | 0.350 $G_{23}$ | | | | |
| 31 | Third Lens | -3.831 | 1.076 $T_3$ | 1.544 | 56.114 | 1.205 | Plastic |
| 32 | | -0.617 | 0.066 $G_{34}$ | | | | |
| 41 | Fourth Lens | 1.398 | 0.346 $T_4$ | 1.640 | 23.529 | -1.540 | Plastic |
| 42 | | 0.524 | 0.500 | | | | |
| 60 | Filter | Infinite | 0.210 | | | | |
| | Filter -Image Plane | Infinite | 0.461 | | | | |
| 71 | Image Plane | Infinite | | | | | |

FIG. 18

| No. | 11 | 12 | 21 | 22 |
|---|---|---|---|---|
| K | -3.270E+00 | 5.169E+00 | 0.000E+00 | -1.074E+02 |
| a4 | 2.651E-01 | 4.882E-01 | 7.867E-02 | -3.585E-01 |
| a6 | 1.632E-01 | -2.036E+00 | 2.036E-02 | 1.312E+00 |
| a8 | -3.185E-03 | 2.621E+01 | -1.103E+00 | -7.142E+00 |
| a10 | 2.840E-01 | -1.561E+02 | 3.299E+01 | 1.874E+01 |
| a12 | -1.499E+00 | 5.437E+02 | -1.336E+02 | -6.129E+00 |
| a14 | 4.624E+00 | -9.4321E+02 | -3.725E+02 | -8.309E+01 |
| a16 | -4.369E+00 | 6.1380E+02 | 2.313E+03 | 1.373E+02 |
| No. | 31 | 32 | 41 | 42 |
| K | 1.979E+01 | -1.237E+00 | -3.750E+01 | -4.722E+00 |
| a4 | 1.312E-01 | 3.611E-01 | -1.361E-01 | -2.149E-01 |
| a6 | -3.955E-01 | -6.467E-01 | -1.482E-01 | 1.174E-01 |
| a8 | 7.540E-01 | 3.717E-01 | 1.098E-01 | -4.841E-02 |
| a10 | 9.569E-02 | 2.536E-02 | 4.970E-02 | 1.238E-02 |
| a12 | -6.948E-01 | -6.768E-02 | -8.109E-02 | -1.233E-03 |
| a14 | -1.260E+00 | 4.909E-03 | 2.901E-02 | -1.787E-04 |
| a16 | 2.046E+00 | 9.417E-03 | -2.734E-03 | 4.050E-05 |

FIG. 19

| Second Example | | | | | | | |
|---|---|---|---|---|---|---|---|
| F=2.090mm, HFOV=45.880deg., Fno=2.40 | | | | | | | |
| No. | | Curvature Radius | Ape. Stop Distance Lens Thickness Air Gap | | Refractive Index | Abbe No. | Focal Length | Material |
| | Object | Infinite | 500.000 | | | | | |
| 11 | First Lens | 1.698 | 0.517 | $T_1$ | 1.640 | 23.529 | -46.484 | Plastic |
| 12 | | 1.415 | 0.167 | $G_{12}$ | | | | |
| 80 | Ape. Stop | Infinite | -0.007 | | | | | |
| 21 | Second Lens | 10.892 | 0.372 | $T_2$ | 1.544 | 56.114 | 4.102 | Plastic |
| 22 | | -2.785 | 0.315 | $G_{23}$ | | | | |
| 31 | Third Lens | -3.814 | 1.164 | $T_3$ | 1.544 | 56.114 | 1.197 | Plastic |
| 32 | | -0.618 | 0.063 | $G_{34}$ | | | | |
| 41 | Fourth Lens | 1.413 | 0.350 | $T_4$ | 1.640 | 23.529 | -1.531 | Plastic |
| 42 | | 0.525 | 0.500 | | | | | |
| 60 | Filter | Infinite | 0.210 | | | | | |
| | Filter -Image Plane | Infinite | 0.461 | | | | | |
| 71 | Image Plane | Infinite | | | | | | |

FIG. 20

| No. | 11 | 12 | 21 | 22 |
|---|---|---|---|---|
| K | -5.554E+00 | 4.700E+00 | 0.000E+00 | -7.427E+01 |
| a4 | 2.223E-01 | 4.660E-01 | 1.194E-01 | -4.094E-01 |
| a6 | 1.085E-01 | -2.460E+00 | 4.994E-01 | 1.324E+00 |
| a8 | -5.946E-02 | 2.618E+01 | -1.401E+00 | -6.817E+00 |
| a10 | 1.968E-01 | -1.482E+02 | 3.052E+01 | 1.832E+01 |
| a12 | -1.741E+00 | 5.645E+02 | -1.188E+02 | -7.962E+00 |
| a14 | 4.285E+00 | -8.460E+02 | -2.542E+02 | -8.596E+01 |
| a16 | -3.218E+00 | -3.100E+02 | 1.714E+03 | 1.519E+02 |
| No. | 31 | 32 | 41 | 42 |
| K | 1.974E+01 | -1.246E+00 | -3.657E+01 | -4.734E+00 |
| a4 | 1.460E-01 | 3.615E-01 | -1.369E-01 | -2.176E-01 |
| a6 | -3.910E-01 | -6.474E-01 | -1.476E-01 | 1.166E-01 |
| a8 | 7.415E-01 | 3.688E-01 | 1.102E-01 | -4.837E-02 |
| a10 | 8.392E-02 | 2.189E-02 | 4.991E-02 | 1.241E-02 |
| a12 | -6.810E-01 | -7.058E-02 | -8.127E-02 | -1.228E-03 |
| a14 | -1.182E+00 | 2.720E-03 | 2.896E-02 | -1.776E-04 |
| a16 | 1.889E+00 | 7.450E-03 | -2.776E-03 | 4.072E-05 |

FIG. 21

| Third Example | | | | | | | |
|---|---|---|---|---|---|---|---|
| F=1.929mm, HFOV=49.294deg., Fno=2.40 | | | | | | | |
| No. | | Curvature Radius | Ape. Stop Distance Lens Thickness Air Gap | | Refractive Index | Abbe No. | Focal Length | Material |
| | Object | Infinite | 500.000 | | | | | |
| 11 | First Lens | 1.982 | 0.244 | $T_1$ | 1.640 | 23.529 | -15.975 | Plastic |
| 12 | | 1.582 | 0.227 | $G_{12}$ | | | | |
| 80 | Ape. Stop | Infinite | 0.006 | | | | | |
| 21 | Second Lens | 6.727 | 0.297 | $T_2$ | 1.544 | 56.114 | 3.730 | Plastic |
| 22 | | -2.875 | 0.335 | $G_{23}$ | | | | |
| 31 | Third Lens | -3.815 | 1.110 | $T_3$ | 1.544 | 56.114 | 1.202 | Plastic |
| 32 | | -0.617 | 0.065 | $G_{34}$ | | | | |
| 41 | Fourth Lens | 1.407 | 0.356 | $T_4$ | 1.640 | 23.529 | -1.529 | Plastic |
| 42 | | 0.522 | 0.500 | | | | | |
| 60 | Filter | Infinite | 0.210 | | | | | |
| | Filter -Image Plane | Infinite | 0.461 | | | | | |
| 71 | Image Plane | Infinite | | | | | | |

FIG. 22

| No. | 11 | 12 | 21 | 22 |
|---|---|---|---|---|
| K | -2.150E+00 | 5.066E+00 | 0.000E+00 | -7.760E+01 |
| a4 | 2.765E-01 | 4.866E-01 | 9.600E-02 | -3.721E-01 |
| a6 | 1.436E-01 | -2.047E+00 | -2.489E-02 | 1.294E+00 |
| a8 | -5.510E-02 | 2.604E+01 | -1.610E+00 | -7.188E+00 |
| a10 | 2.026E-01 | -1.571E+02 | 3.046E+01 | 1.844E+01 |
| a12 | -1.672E+00 | 5.385E+02 | -1.421E+02 | -7.255E+00 |
| a14 | 4.040E+00 | -9.740E+02 | -3.851E+02 | -8.660E+01 |
| a16 | -6.578E+00 | 4.695E+02 | 2.447E+03 | 1.310E+02 |
| No. | 31 | 32 | 41 | 42 |
| K | 1.991E+01 | -1.235E+00 | -3.439E+01 | -4.478E+00 |
| a4 | 1.378E-01 | 3.603E-01 | -1.374E-01 | -2.069E-01 |
| a6 | -3.959E-01 | -6.491E-01 | -1.472E-01 | 1.212E-01 |
| a8 | 7.528E-01 | 3.706E-01 | 1.124E-01 | -4.904E-02 |
| a10 | 1.010E-01 | 2.538E-02 | 5.022E-02 | 1.241E-02 |
| a12 | -6.816E-01 | -6.698E-02 | -8.121E-02 | -1.215E-03 |
| a14 | -1.250E+00 | 5.937E-03 | 2.889E-02 | -1.768E-04 |
| a16 | 2.001E+00 | 1.056E-02 | -2.769E-03 | 3.914E-05 |

FIG. 23

| Fourth Example | | | | | | | |
|---|---|---|---|---|---|---|---|
| F=2.068mm, HFOV=47.797deg., Fno=2.40 | | | | | | | |
| No. | | Curvature Radius | Ape. Stop Distance Lens Thickness Air Gap | | Refractive Index | Abbe No. | Focal Length | Material |
| | Object | Infinite | 500.000 | | | | | |
| 11 | First Lens | 1.700 | 0.365 | $T_1$ | 1.640 | 23.529 | 171.003 | Plastic |
| 12 | | 1.581 | 0.247 | $G_{12}$ | | | | |
| 80 | Ape. Stop | Infinite | 0.007 | | | | | |
| 21 | Second Lens | 7.635 | 0.275 | $T_2$ | 1.544 | 56.114 | 3.809 | Plastic |
| 22 | | -2.821 | 0.401 | $G_{23}$ | | | | |
| 31 | Third Lens | -3.765 | 1.087 | $T_3$ | 1.544 | 56.114 | 1.232 | Plastic |
| 32 | | -0.629 | 0.079 | $G_{34}$ | | | | |
| 41 | Fourth Lens | 1.474 | 0.335 | $T_4$ | 1.640 | 23.529 | -1.440 | Plastic |
| 42 | | 0.519 | 0.500 | | | | | |
| 60 | Filter | Infinite | 0.210 | | | | | |
| | Filter -Image Plane | Infinite | 0.296 | | | | | |
| 71 | Image Plane | Infinite | | | | | | |

FIG. 24

| No. | 11 | 12 | 21 | 22 |
|---|---|---|---|---|
| K | -3.471E+00 | 4.805E+00 | 0.000E+00 | -5.695E+01 |
| a4 | 2.354E-01 | 4.081E-01 | 1.172E-01 | -3.880E-01 |
| a6 | 1.005E-01 | -2.060E+00 | -8.127E-02 | 1.272E+00 |
| a8 | -2.889E-02 | 2.566E+01 | -1.799E+00 | -7.171E+00 |
| a10 | 2.970E-01 | -1.576E+02 | 3.200E+01 | 1.908E+01 |
| a12 | -1.503E+00 | 5.525E+02 | -1.151E+02 | -4.734E+00 |
| a14 | 4.514E+00 | -8.517E+02 | -1.158E+02 | -8.366E+01 |
| a16 | -4.597E+00 | 2.280E+02 | 8.027E+02 | 1.018E+02 |
| No. | 31 | 32 | 41 | 42 |
| K | 2.017E+01 | -1.270E+00 | -3.640E+01 | -4.522E+00 |
| a4 | 1.015E-01 | 3.682E-01 | -1.409E-01 | -2.042E-01 |
| a6 | -4.449E-01 | -6.481E-01 | -1.476E-01 | 1.141E-01 |
| a8 | 7.191E-01 | 3.634E-01 | 1.101E-01 | -4.896E-02 |
| a10 | 1.008E-01 | 1.679E-02 | 4.960E-02 | 1.238E-02 |
| a12 | -6.511E-01 | -7.323E-02 | -8.126E-02 | -1.221E-03 |
| a14 | -1.254E+00 | 1.563E-03 | 2.890E-02 | -1.765E-04 |
| a16 | 1.885E+00 | 7.030E-03 | -2.796E-03 | 4.019E-05 |

FIG. 25

| | Fifth Example | | | | | | |
|---|---|---|---|---|---|---|---|
| | F=2.128mm, HFOV=46.406deg., Fno=2.40 | | | | | | |
| No. | | Curvature Radius | Ape. Stop Distance Lens Thickness Air Gap | | Refractive Index | Abbe No. | Focal Length | Material |
| | Object | Infinite | 500.000 | | | | | |
| 11 | First Lens | 1.791 | 0.350 | $T_1$ | 1.640 | 23.529 | -24.598 | Plastic |
| 12 | | 1.486 | 0.293 | $G_{12}$ | | | | |
| 80 | Ape. Stop | Infinite | 0.004 | | | | | |
| 21 | Second Lens | 6.926 | 0.382 | $T_2$ | 1.544 | 56.114 | 4.269 | Plastic |
| 22 | | -3.445 | 0.217 | $G_{23}$ | | | | |
| 31 | Third Lens | -4.023 | 1.312 | $T_3$ | 1.544 | 56.114 | 1.199 | Plastic |
| 32 | | -0.628 | 0.050 | $G_{34}$ | | | | |
| 41 | Fourth Lens | 1.440 | 0.338 | $T_4$ | 1.640 | 23.529 | -1.558 | Plastic |
| 42 | | 0.537 | 0.500 | | | | | |
| 60 | Filter | Infinite | 0.210 | | | | | |
| | Filter -Image Plane | Infinite | 0.597 | | | | | |
| 71 | Image Plane | Infinite | | | | | | |

FIG. 26

| No. | 11 | 12 | 21 | 22 |
|---|---|---|---|---|
| K | -2.225E+00 | 5.410E+00 | 0.000E+00 | -8.663E+01 |
| a4 | 2.745E-01 | 4.851E-01 | 1.062E-01 | -3.586E-01 |
| a6 | 1.759E-01 | -2.034E+00 | -3.414E-02 | 1.350E+00 |
| a8 | 2.556E-02 | 2.600E+01 | -1.332E+00 | -7.039E+00 |
| a10 | 2.318E-01 | -1.572E+02 | 3.415E+01 | 1.887E+01 |
| a12 | -1.657E+00 | 5.445E+02 | -1.181E+02 | -6.176E+00 |
| a14 | 4.792E+00 | -9.063E+02 | -2.952E+02 | -8.514E+01 |
| a16 | -2.740E+00 | 6.810E+02 | 1.523E+03 | 1.303E+02 |
| No. | 31 | 32 | 41 | 42 |
| K | 2.062E+01 | -1.269E+00 | -3.882E+01 | -5.024E+00 |
| a4 | 1.308E-01 | 3.739E-01 | -1.314E-01 | -2.172E-01 |
| a6 | -4.245E-01 | -6.369E-01 | -1.548E-01 | 1.176E-01 |
| a8 | 7.224E-01 | 3.704E-01 | 1.067E-01 | -4.874E-02 |
| a10 | 8.151E-02 | 1.853E-02 | 4.916E-02 | 1.229E-02 |
| a12 | -7.114E-01 | -7.389E-02 | -8.101E-02 | -1.243E-03 |
| a14 | -1.384E+00 | 2.489E-03 | 2.914E-02 | -1.774E-04 |
| a16 | 1.590E+00 | 1.041E-02 | -2.658E-03 | 4.128E-05 |

FIG. 27

| Sixth Example ||||||||
|---|---|---|---|---|---|---|---|
| F=2.077mm, HFOV=47.748deg., Fno=2.40 ||||||||
| No. | | Curvature Radius | Ape. Stop Distance Lens Thickness Air Gap | | Refractive Index | Abbe No. | Focal Length | Material |
| | Object | Infinite | 500.000 | | | | | |
| 11 | First Lens | 1.785 | 0.338 | $T_1$ | 1.640 | 23.529 | -106.060 | Plastic |
| 12 | | 1.610 | 0.270 | $G_{12}$ | | | | |
| 80 | Ape. Stop | Infinite | 0.020 | | | | | |
| 21 | Second Lens | 7.030 | 0.364 | $T_2$ | 1.544 | 56.114 | 4.535 | Plastic |
| 22 | | -3.752 | 0.360 | $G_{23}$ | | | | |
| 31 | Third Lens | -3.814 | 0.917 | $T_3$ | 1.544 | 56.114 | 1.244 | Plastic |
| 32 | | -0.625 | 0.056 | $G_{34}$ | | | | |
| 41 | Fourth Lens | 1.413 | 0.346 | $T_4$ | 1.640 | 23.529 | -1.546 | Plastic |
| 42 | | 0.528 | 0.500 | | | | | |
| 60 | Filter | Infinite | 0.210 | | | | | |
| | Filter -Image Plane | Infinite | 0.458 | | | | | |
| 71 | Image Plane | Infinite | | | | | | |

FIG. 28

| No. | 11 | 12 | 21 | 22 |
|---|---|---|---|---|
| K | -2.969E+00 | 5.036E+00 | 0.000E+00 | -9.617E+01 |
| a4 | 2.646E-01 | 4.660E-01 | 7.736E-02 | -3.816E-01 |
| a6 | 1.595E-01 | -2.031E+00 | -8.170E-02 | 1.267E+00 |
| a8 | -1.815E-03 | 2.618E+01 | -1.152E+00 | -7.094E+00 |
| a10 | 3.005E-01 | -1.556E+02 | 3.349E+01 | 1.897E+01 |
| a12 | -1.429E+00 | 5.496E+02 | -1.336E+02 | -6.033E+00 |
| a14 | 4.892E+00 | -9.167E+02 | -3.895E+02 | -8.478E+01 |
| a16 | -3.479E+00 | 6.400E+02 | 2.167E+03 | 1.299E+02 |
| No. | 31 | 32 | 41 | 42 |
| K | 1.886E+01 | -1.278E+00 | -3.243E+01 | -4.515E+00 |
| a4 | 1.111E-01 | 3.707E-01 | -1.171E-01 | -2.158E-01 |
| a6 | -4.116E-01 | -6.388E-01 | -1.469E-01 | 1.162E-01 |
| a8 | 7.446E-01 | 3.796E-01 | 1.094E-01 | -4.870E-02 |
| a10 | 1.002E-01 | 3.019E-02 | 4.943E-02 | 1.234E-02 |
| a12 | -6.800E-01 | -6.575E-02 | -8.123E-02 | -1.243E-03 |
| a14 | -1.267E+00 | 4.876E-03 | 2.893E-02 | -1.807E-04 |
| a16 | 1.919E+00 | 8.341E-03 | -2.791E-03 | 4.035E-05 |

FIG. 29

| Seventh Example ||||||||
|---|---|---|---|---|---|---|---|
| F=1.921mm, HFOV=48.807deg., Fno=2.40 ||||||||
| No. | | Curvature Radius | Ape. Stop Distance Lens Thickness Air Gap | | Refractive Index | Abbe No. | Focal Length | Material |
| | Object | Infinite | 500.000 | | | | | |
| 11 | First Lens | 1.817 | 0.361 | $T_1$ | 1.640 | 23.529 | -32.916 | Plastic |
| 12 | | 1.543 | 0.237 | $G_{12}$ | | | | |
| 80 | Ape. Stop | Infinite | 0.020 | | | | | |
| 21 | Second Lens | 6.072 | 0.365 | $T_2$ | 1.544 | 56.114 | 4.021 | Plastic |
| 22 | | -3.365 | 0.200 | $G_{23}$ | | | | |
| 31 | Third Lens | -3.818 | 1.277 | $T_3$ | 1.544 | 56.114 | 1.180 | Plastic |
| 32 | | -0.616 | 0.092 | $G_{34}$ | | | | |
| 41 | Fourth Lens | 1.444 | 0.362 | $T_4$ | 1.640 | 23.529 | -1.500 | Plastic |
| 42 | | 0.522 | 0.500 | | | | | |
| 60 | Filter | Infinite | 0.210 | | | | | |
| | Filter -Image Plane | Infinite | 0.380 | | | | | |
| 71 | Image Plane | Infinite | | | | | | |

FIG. 30

| No. | 11 | 12 | 21 | 22 |
|---|---|---|---|---|
| K | -2.989E+00 | 5.060E+00 | 0.000E+00 | -1.071E+02 |
| a4 | 2.614E-01 | 4.862E-01 | 6.909E-02 | -3.640E-01 |
| a6 | 1.601E-01 | -2.075E+00 | -5.989E-02 | 1.311E+00 |
| a8 | -1.848E-02 | 2.613E+01 | -1.338E+00 | -7.075E+00 |
| a10 | 2.624E-01 | -1.557E+02 | 3.266E+01 | 1.892E+01 |
| a12 | -1.443E+00 | 5.463E+02 | -1.328E+02 | -6.476E+00 |
| a14 | 4.810E+00 | -9.375E+02 | -3.672E+02 | -9.346E+01 |
| a16 | -4.119E+00 | 5.856E+02 | 2.290E+03 | 1.433E+02 |
| No. | 31 | 32 | 41 | 42 |
| K | 1.999E+01 | -1.233E+00 | -3.756E+01 | -4.633E+00 |
| a4 | 1.309E-01 | 3.616E-01 | -1.391E-01 | -2.176E-01 |
| a6 | -3.890E-01 | -6.488E-01 | -1.500E-01 | 1.177E-01 |
| a8 | 7.416E-01 | 3.760E-01 | 1.088E-01 | -4.850E-02 |
| a10 | 4.332E-02 | 2.932E-02 | 4.942E-02 | 1.235E-02 |
| a12 | -5.051E-01 | -6.746E-02 | -8.121E-02 | -1.241E-03 |
| a14 | -1.019E+00 | 4.515E-03 | 2.905E-02 | -1.806E-04 |
| a16 | 4.090E-01 | 8.301E-03 | -2.731E-03 | 3.968E-05 |

FIG. 31

|  | Example 1 | Example 2 | Example 3 | Example 4 | Example 5 | Example 6 | Example 7 |
|---|---|---|---|---|---|---|---|
| $T_{all}$ | 2.042 | 2.403 | 2.007 | 2.063 | 2.383 | 1.966 | 2.365 |
| $G_{aa}$ | 0.667 | 0.538 | 0.633 | 0.735 | 0.564 | 0.706 | 0.549 |
| BFL | 1.171 | 1.171 | 1.171 | 1.006 | 1.307 | 1.168 | 1.090 |
| EFL | 2.004 | 2.090 | 1.929 | 2.068 | 2.128 | 2.077 | 1.921 |
| $G_{23}/(G_{12}+G_{34})$ | 1.104 | 1.420 | 1.126 | 1.203 | 0.627 | 1.039 | 0.573 |
| $G_{23}/T_2$ | 1.254 | 0.847 | 1.127 | 1.458 | 0.569 | 0.988 | 0.548 |
| $(BFL+T_3)/G_{12}$ | 8.948 | 14.658 | 9.798 | 8.240 | 8.823 | 7.168 | 9.210 |
| $EFL/G_{23}$ | 5.731 | 6.626 | 5.756 | 5.154 | 9.785 | 5.771 | 9.605 |
| $BFL/T_1$ | 3.430 | 2.264 | 4.791 | 2.754 | 3.728 | 3.451 | 3.019 |
| $T_1/(G_{12}+G_{34})$ | 1.078 | 2.329 | 0.822 | 1.095 | 1.011 | 0.976 | 1.034 |
| $(T_3+G_{23})/T_4$ | 4.124 | 4.230 | 4.060 | 4.444 | 4.525 | 3.692 | 4.080 |
| $T_{all}/G_{aa}$ | 3.064 | 4.471 | 3.173 | 2.808 | 4.223 | 2.782 | 4.308 |
| $(G_{23}+T_3)/T_2$ | 5.112 | 3.975 | 4.860 | 5.409 | 4.002 | 3.508 | 4.047 |
| $BFL/G_{23}$ | 3.349 | 3.714 | 3.496 | 2.508 | 6.010 | 3.244 | 5.450 |
| $T_3/G_{aa}$ | 1.615 | 2.165 | 1.754 | 1.480 | 2.325 | 1.298 | 2.326 |
| $T_{all}/G_{23}$ | 5.840 | 7.620 | 5.991 | 5.142 | 10.958 | 5.461 | 11.825 |
| $T_3/G_{23}$ | 3.077 | 3.691 | 3.312 | 2.711 | 6.034 | 2.549 | 6.385 |
| $T_{all}/T_4$ | 5.907 | 6.872 | 5.641 | 6.158 | 7.049 | 5.683 | 6.533 |

FIG. 32

OPTICAL IMAGING LENS AND ELECTRONIC DEVICE COMPRISING THE SAME

CROSS REFERENCE TO RELATED APPLICATION

This application claims priority to Chinese Application No. 201310746543.3, filed on Dec. 30, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set with shorter length and an electronic device which includes such optical imaging lens set.

2. Description of the Prior Art

In recent years, the popularity of mobile phones and digital cameras makes photography modules (including optical imaging lens set, holder and sensor, etc) well developed. Mobile phones and digital cameras become lighter and thinner, so the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality.

As the requirements of good imaging quality increase, and the conventional optical imaging lens set of four lens element can hardly satisfy these requirements, a novel optical imaging lens set with small total length and good imaging quality is needed. U.S. Pat. Nos. 7,920,340, 7,660,049 and 7,848,032 disclose an optical imaging lens set of four lens elements respectively, and all of the total length (the distance between the first object surface of the first lens element to an image plane) of the optical imaging lens sets are over than 7 mm. The size of the optical imaging lens set is too big to satisfy the specification requirements of consumer electronics products.

Therefore, how to reduce the total length of a photographic device, but still maintain good optical performance, is an important research objective.

SUMMARY OF THE INVENTION

In light of the above, the present invention proposes an optical imaging lens set that is lightweight, has shorter total length, has a low production cost, has an enlarged half of field of view, has a high resolution and has high image quality. The optical imaging lens set of four lens elements of the present invention has a first lens element, an aperture stop, a second lens element, a third lens element and a fourth lens element sequentially from an object side to an image side along an optical axis.

The present invention provides an optical imaging lens set, from an object side toward an image side in order along an optical axis comprising: a first lens element, an aperture stop, a second lens element, a third lens element and a fourth lens element, the first lens element having an image-side surface with a concave part in a vicinity of its periphery; the second lens having an object-side surface with a convex part in a vicinity of the optical axis, and an image-side surface with a convex part in a vicinity of its periphery; the third lens element with positive refractive power, having an object-side surface with a concave part in a vicinity of the optical axis, and an image-side surface with a convex part in a vicinity of its periphery; the fourth lens having an image-side surface with a concave part in a vicinity of the optical axis as well as a convex part in a vicinity of its periphery; wherein the optical imaging lens set does not include any lens element with refractive power other than said first, second, third and fourth lens elements.

In the optical imaging lens set of four lens elements of the present invention, an air gap $G_{12}$ along the optical axis is disposed between the first lens element and the second lens element, an air gap $G_{23}$ along the optical axis is disposed between the second lens element and the third lens element, an air gap $G_{34}$ along the optical axis is disposed between the third lens element and the fourth lens element, and the sum of total three air gaps between adjacent lens elements from the first lens element to the fourth lens element along the optical axis is $G_{aa}=G_{12}+G_{23}+G_{34}$.

In the optical imaging lens set of four lens elements of the present invention, the first lens element has a first lens element thickness $T_1$ along the optical axis, the second lens element has a second lens element thickness $T_2$ along the optical axis, the third lens element has a third lens element thickness $T_3$ along the optical axis, the fourth lens element has a fourth lens element thickness $T_4$ along the optical axis, and the total thickness of all the lens elements in the optical imaging lens set along the optical axis is $T_{all}=T_1+T_2+T_3+T_4$. In addition, the distance between the image-side surface of the fourth lens element to an image plane along the optical axis is BFL (back focal length); the effective focal length of the optical imaging lens set is EFL.

In the optical imaging lens set of four lens elements of the present invention, the relationship $T_1/(G_{12}+G_{34})\leq 2.50$ is satisfied.

In the optical imaging lens set of four lens elements of the present invention, the relationship $3.50\leq(T_3+G_{23})/T_4$ is satisfied.

In the optical imaging lens set of four lens elements of the present invention, the relationship $2.49\leq(T_{all}/G_{aa})$ is satisfied.

In the optical imaging lens set of four lens elements of the present invention, the relationship $2.5\leq(G_{23}+T_3)/T_2$ is satisfied.

In the optical imaging lens set of four lens elements of the present invention, the relationship $2.5\leq(BFL/G_{23})$ is satisfied.

In the optical imaging lens set of four lens elements of the present invention, the relationship $G_{23}/(G_{12}+G_{34})\leq 1.50$ is satisfied.

In the optical imaging lens set of four lens elements of the present invention, the relationship $0.54\leq(G_{23}/T_2)$ is satisfied.

In the optical imaging lens set of four lens elements of the present invention, the relationship $7.00\leq(BFL+T_3)/G_{12}$ is satisfied.

In the optical imaging lens set of four lens elements of the present invention, the relationship $3.70\leq(EFL/G_{23})\leq 10.00$ is satisfied.

In the optical imaging lens set of four lens elements of the present invention, the relationship $2.20\leq(BFL/T_1)$ is satisfied.

In the optical imaging lens set of four lens elements of the present invention, the relationship $3.30\leq(T_{all}/G_{23})$ is satisfied.

In the optical imaging lens set of four lens elements of the present invention, the relationship $2.50\leq(T_3/G_{23})$ is satisfied.

In the optical imaging lens set of four lens elements of the present invention, the relationship $1.25\leq(T_3/G_{aa})$ is satisfied.

In the optical imaging lens set of four lens elements of the present invention, the relationship $5.00 \leq (T_{all}/T_4)$ is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates a first example of the optical imaging lens set of the present invention.

FIG. 2A illustrates the longitudinal spherical aberration on the image plane of the first example.

FIG. 2B illustrates the astigmatic aberration on the sagittal direction of the first example.

FIG. 2C illustrates the astigmatic aberration on the tangential direction of the first example.

FIG. 2D illustrates the distortion aberration of the first example.

FIG. 13 illustrates a seventh example of the optical imaging lens set of four lens elements of the present invention.

FIG. 14A illustrates the longitudinal spherical aberration on the image plane of the seventh example.

FIG. 14B illustrates the astigmatic aberration on the sagittal direction of the seventh example.

FIG. 14C illustrates the astigmatic aberration on the tangential direction of the seventh example.

FIG. 14D illustrates the distortion aberration of the seventh example.

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION

Figure 15:
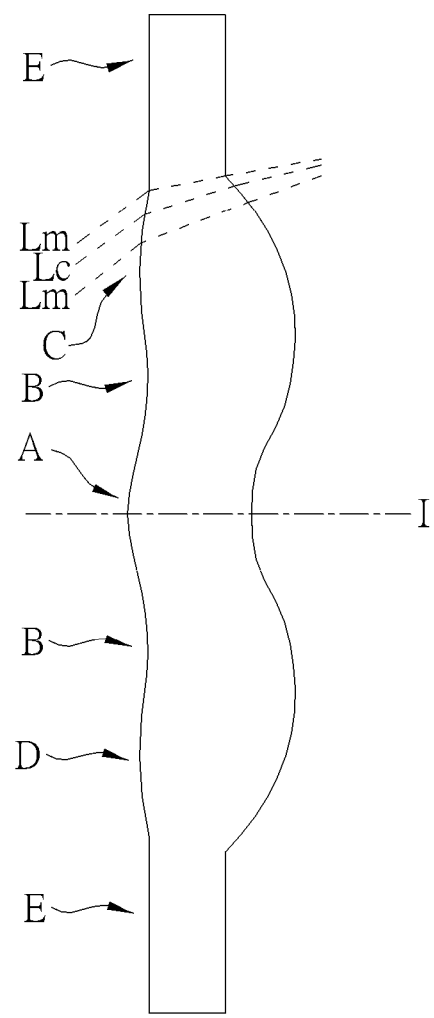
FIG. 15 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 15 for example, the optical axis is "I" and the lens element is symmetrical with respect to the optical axis I. The object side of the lens element has a convex part in the region A, a concave part in the region B, and a convex part in the region C and D because region A is more convex in a direction parallel with the optical axis than an outer region (region B) next to region A, region B is more concave than region C and D and region C and D is similarly more convex than region E. "A circular periphery of a certain lens element" refers to a circular periphery region of a surface on the lens element for light to pass through, that is, region C and D in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

As shown in FIG. 1, the optical imaging lens set 1 of fourth lens elements of the present invention, sequentially located from an object side 2 (where an object is located) to an image side 3 along an optical axis 4, has a first lens element 10, an aperture stop 80, a second lens element 20, a third lens element 30, a fourth lens element 40, a filter 60 and an image plane 71. Generally speaking, the first lens element 10, the second lens element 20, the third lens element 30 and the fourth lens element 40 may be made of a transparent plastic material and each has an appropriate refractive power, but the present invention is not limited to this. There are exclusively fourth lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the first lens element 10 and the second lens element 20. When light emitted or reflected by an object (not shown) which is located at the object side 2 enters the optical imaging lens set 1 of the present invention, it forms a clear and sharp image on the image plane 71 at the image side 3 after passing through the first lens element 10, the aperture stop 80, the second lens element 20, the third lens element 30, the fourth lens element 40 and the filter 60.

In the embodiments of the present invention, the optional filter 60 may be a filter of various suitable functions, for example, the filter 60 may be an infrared cut filter (IR cut filter), placed between the fourth lens element 40 and the image plane 71. The filter 60 is made of glass, without affecting the focal length of the optical lens element system, namely the optical imaging lens set, of the present invention.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; and the fourth lens element 40 has a fourth object-side surface 41 and a fourth image-side surface 42.

Each lens element in the optical imaging lens set 1 of the present invention further has a central thickness on the optical axis 4. For example, the first lens element 10 has a first lens element thickness $T_1$, the second lens element 20 has a second lens element thickness $T_2$, the third lens element 30 has a third lens element thickness $T_3$, and the fourth lens element 40 has a fourth lens element thickness $T_4$. Therefore, the total thickness of all the lens elements in the optical imaging lens set 1 along the optical axis 4 is $T_{all}=T_1+T_2+T_3+T_4$.

In addition, between two adjacent lens elements in the optical imaging lens set 1 of the present invention there is an air gap G along the optical axis 4. For example, an air gap $G_{12}$ is disposed between the first lens element 10 and the second lens element 20, an air gap $G_{23}$ is disposed between the second lens element 20 and the third lens element 30, and an air gap $G_{34}$ is disposed between the third lens element 30 and the fourth lens element 40. Therefore, the sum of total three air gaps between adjacent lens elements from the first lens element 10 to the fourth lens element 40 along the optical axis 4 is $G_{aa}=G_{12}+G_{23}+G_{34}$.

Besides, the distance between the fourth image-side surface 42 of the fourth lens element 40 to the image plane 71 along the optical axis 4 is BFL.

FIRST EXAMPLE

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height".

The optical imaging lens set 1 of the first example has four lens elements 10 to 40, and all of the lens elements are made of a plastic material and have refractive power. The optical imaging lens set 1 also has an aperture stop 80, a filter 60, and an image plane 71. The aperture stop 80 is provided between the first lens element 10 and the second lens element 20. The filter 60 may be an infrared filter (IR cut filter) to prevent inevitable infrared light from reaching the image plane to adversely affect the imaging quality.

The first lens element 10 has negative refractive power. The first object-side surface 11 facing toward the object side 2 is a convex surface, having a convex part in the vicinity of the optical axis and a convex part in a vicinity of its circular periphery; The first image-side surface 12 facing toward the image side 3 is a convex surface, having a concave part in the vicinity of the optical axis and a concave part 17 in a vicinity of its circular periphery.

The second lens element 20 has positive refractive power. The second object-side surface 21 facing toward the object side 2 is a convex surface, having a convex part 23 in the vicinity of the optical axis and a convex part in a vicinity of its circular periphery; The second image-side surface 22 facing toward the image side 3 is a convex surface, having a convex part in the vicinity of the optical axis and a convex part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 is a concave surface, having a concave part 33 in the vicinity of the optical axis and a concave part in a vicinity of its circular periphery; The third image-side surface 32 facing toward the image side 3 is a convex surface, having a convex part 36 in the vicinity of the optical axis and a convex part in a vicinity of its circular periphery. Both the third object-side surface 31 and the third image-side 32 of the third lens element 30 are aspherical surfaces.

The fourth lens element 40 has negative refractive power. The fourth object-side surface 41 facing toward the object side 2, has a convex part 43 in the vicinity of the optical axis and a concave part 44 in a vicinity of its circular periphery; The fourth image-side surface 42 facing toward the image side 3, has a concave part 46 in the vicinity of the optical axis and a convex part 47 in a vicinity of its circular periphery. Both the fourth object-side surface 41 and the fourth image-side 42 of the fourth lens element 40 are aspherical surfaces. The filter 60 may be disposed between the fourth lens element 40 and the image plane 71.

In the optical imaging lens element 1 of the present invention, the object-side surfaces 11/21/31/41 and image-side surfaces 12/22/32/42 are all aspherical. These aspheric coefficients are defined according to the following formula:

$$Z(Y) = \frac{Y^2}{R} \Big/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and a2i is the aspheric coefficient of the 2i order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 3.880 mm. The image height is 2.270 mm. Some important ratios of the first example are as follows:

$T_{all}$=2.042
$G_{aa}$=0.667
BFL=1.171
EFL=2.004
$G_{23}/(G_{12}+G_{34})$=1.104
$G_{23}/T_2$=1.254
$(BFL+T_3)/G_{12}$=8.948
$EFL/G_{23}$=5.731
$BFL/T_1$=3.430
$T_1/(G_{12}+G_{34})$=1.078
$(T_3+G_{23})/T_4$=4.124
$T_{all}/G_{aa}$=3.064
$(G_{23}+T_3)/T_2$=5.112
$BFL/G_{23}$=3.349
$T_3/G_{aa}$=1.615
$T_{all}/G_{23}$=5.840
$T_3/G_{23}$=3.077
$T_{all}/T_4$=5.907

SECOND EXAMPLE

Figure 3:
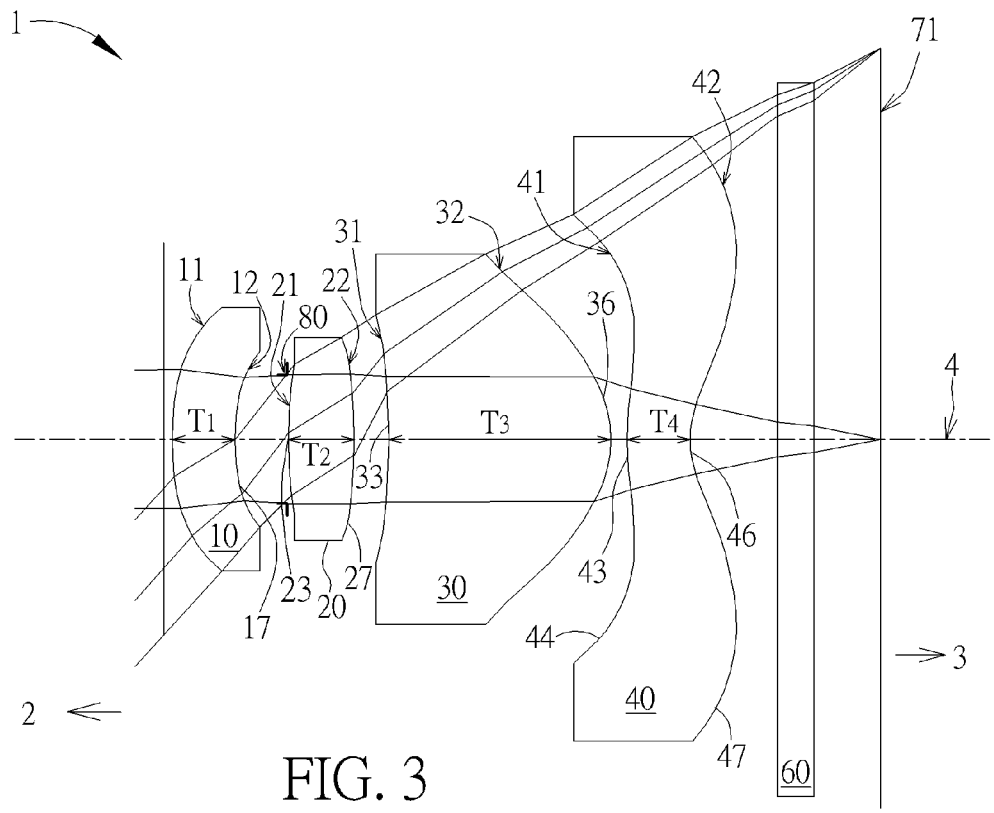
FIG. 3 illustrates a second example of the optical imaging lens set of four lens elements of the present invention.
Figures 4A, 4B, 4C, 4D:
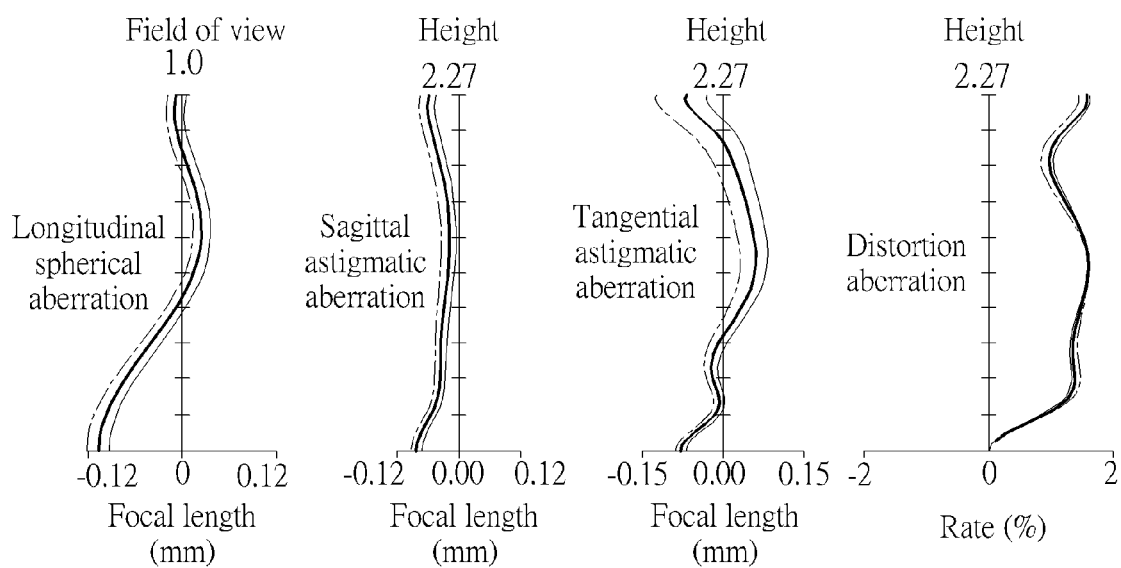
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 20 while the aspheric surface data are shown in FIG. 21. The length of the optical imaging lens set is 4.112 mm. The image height is 2.270 mm. Some important ratios of the second example are as follows:

$T_{all}$=2.403
$G_{aa}$=0.538
BFL=1.171
EFL=2.090
$G_{23}/(G_{12}+G_{34})$=1.420
$G_{23}/T_2$=0.847
$(BFL+T_3)/G_{12}$=14.658
$EFL/G_{23}$=6.626
$BFL/T_1$=2.264
$T_1/(G_{12}+G_{34})$=2.329
$(T_3+G_{23})/T_4$=4.230
$T_{all}/G_{aa}$=4.471
$(G_{23}+T_3)/T_2$=3.975
$BFL/G_{23}$=3.714
$T_3/G_{aa}$=2.165
$T_{all}/G_{23}$=7.620
$T_3/G_{23}$=3.691
$T_{all}/T_4$=6.872

THIRD EXAMPLE

Figure 5:
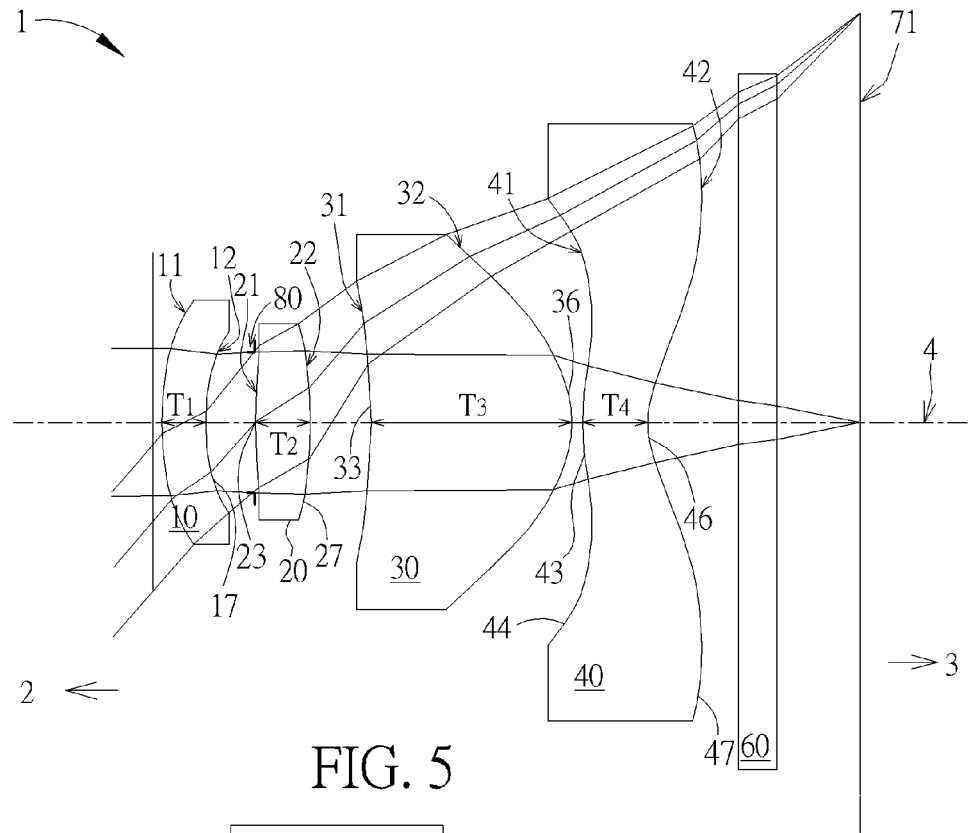
FIG. 5 illustrates a third example of the optical imaging lens set of four lens elements of the present invention.
Figures 6A, 6B, 6C, 6D:
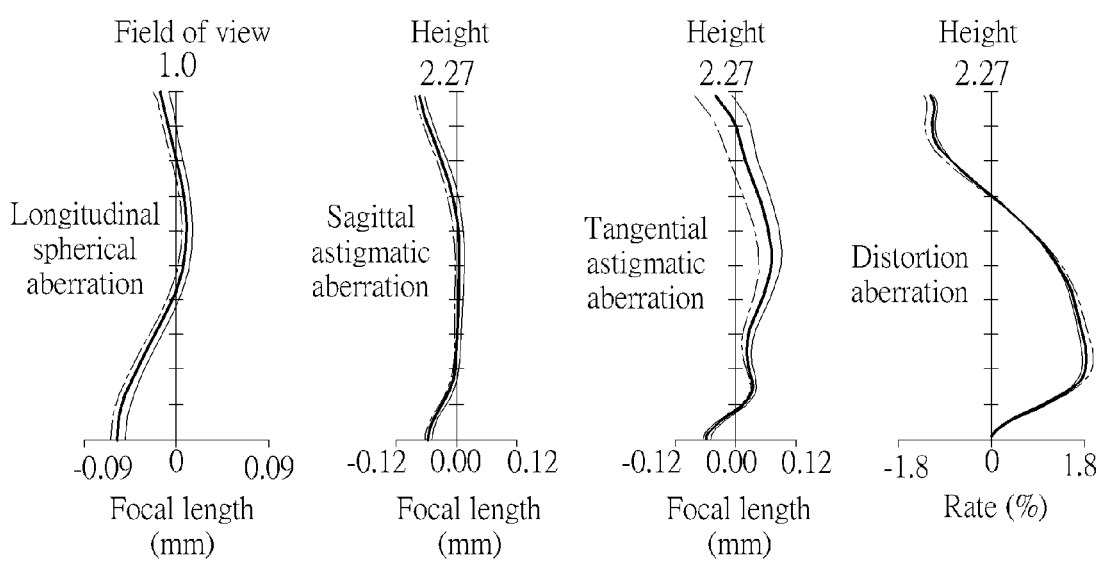
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example. The optical data of the third example of the optical imaging lens set are shown in FIG. 23 while the aspheric surface data are shown in FIG. 24. The length of the optical imaging lens set is 3.811 mm. The image height is 2.270 mm. Some important ratios of the third example are as follows:

$T_{all}$=2.007
$G_{aa}$=0.633
BFL=1.171
EFL=1.929
$G_{23}/(G_{12}+G_{34})$=1.126
$G_{23}/T_2$=1.127
$(BFL+T_3)/G_{12}$=9.798
$EFL/G_{23}$=5.756
$BFL/T_1$=4.791
$T_1/(G_{12}+G_{34})$=0.822
$(T_3+G_{23})/T_4$=4.060
$T_{all}/G_{aa}$=3.173
$(G_{23}+T_3)/T_2$=4.860
$BFL/G_{23}$=3.496
$T_3/G_{aa}$=1.754
$T_{all}/G_{23}$=5.991
$T_3/G_{23}$=3.312
$T_{all}/T_4$=5.641

FOURTH EXAMPLE

Figure 7:
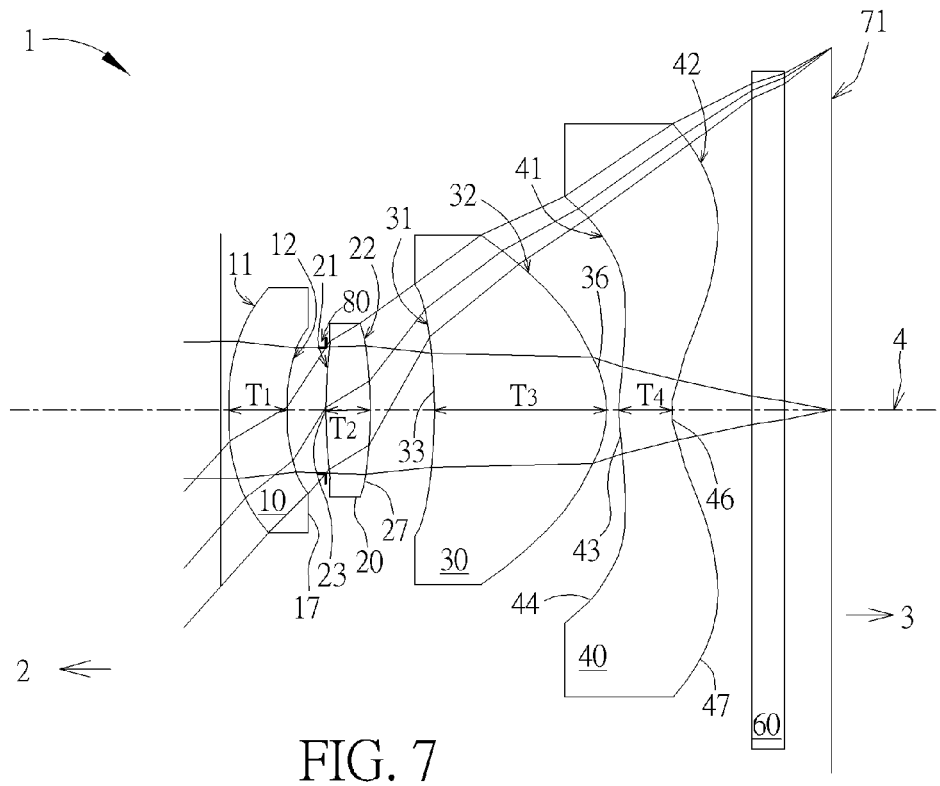
FIG. 7 illustrates a fourth example of the optical imaging lens set of four lens elements of the present invention.
Figures 8A, 8B, 8C, 8D:
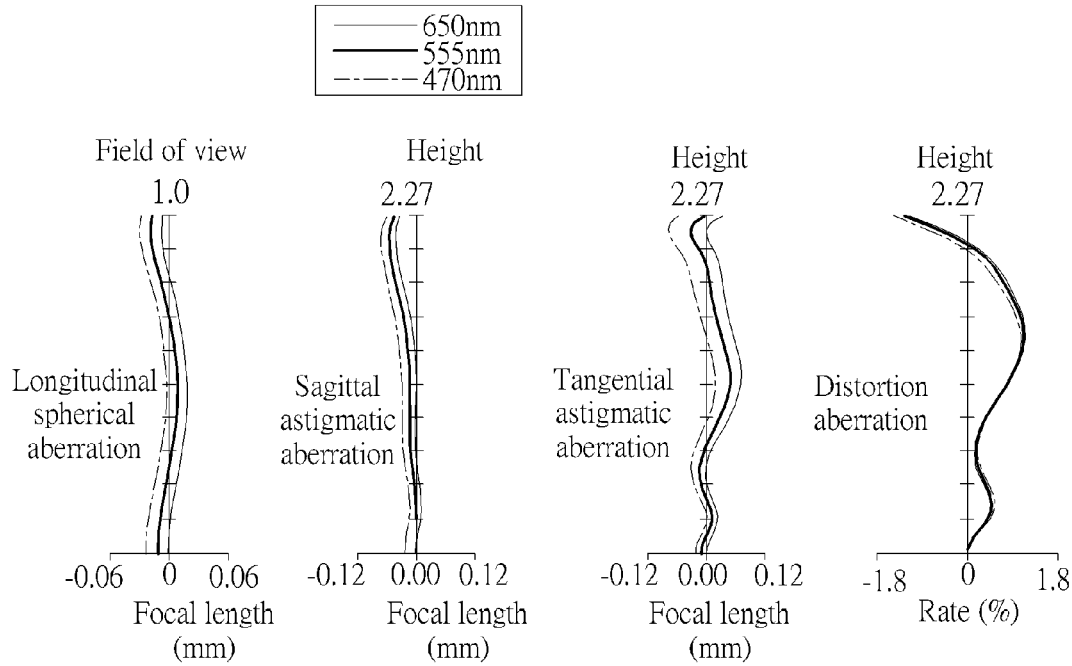
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the first lens element 10 with positive refractive power. The optical data of the fourth example of the optical imaging lens set are shown in FIG. 24 while the aspheric surface data are shown in FIG. 25. The length of the optical imaging lens set is 3.804 mm. The image height is 2.270 mm. Some important ratios of the fourth example are as follows:

$T_{all}$=2.063
$G_{aa}$=0.735
BFL=1.006
EFL=2.068
$G_{23}/(G_{12}+G_{34})$=1.203
$G_{23}/T_2$=1.458
$(BFL+T_3)/G_{12}$=8.240
$EFL/G_{23}$=5.154
$BFL/T_1$=2.754
$T_1/(G_{12}+G_{34})$=1.095
$(T_3+G_{23})/T_4$=4.444
$T_{all}/G_{aa}$=2.808
$(G_{23}+T_3)/T_2$=5.409
$BFL/G_{23}$=2.508
$T_3/G_{aa}$=1.480
$T_{all}/G_{23}$=5.142
$T_3/G_{23}$=2.711
$T_{all}/T_4$=6.158

FIFTH EXAMPLE

Figure 9:
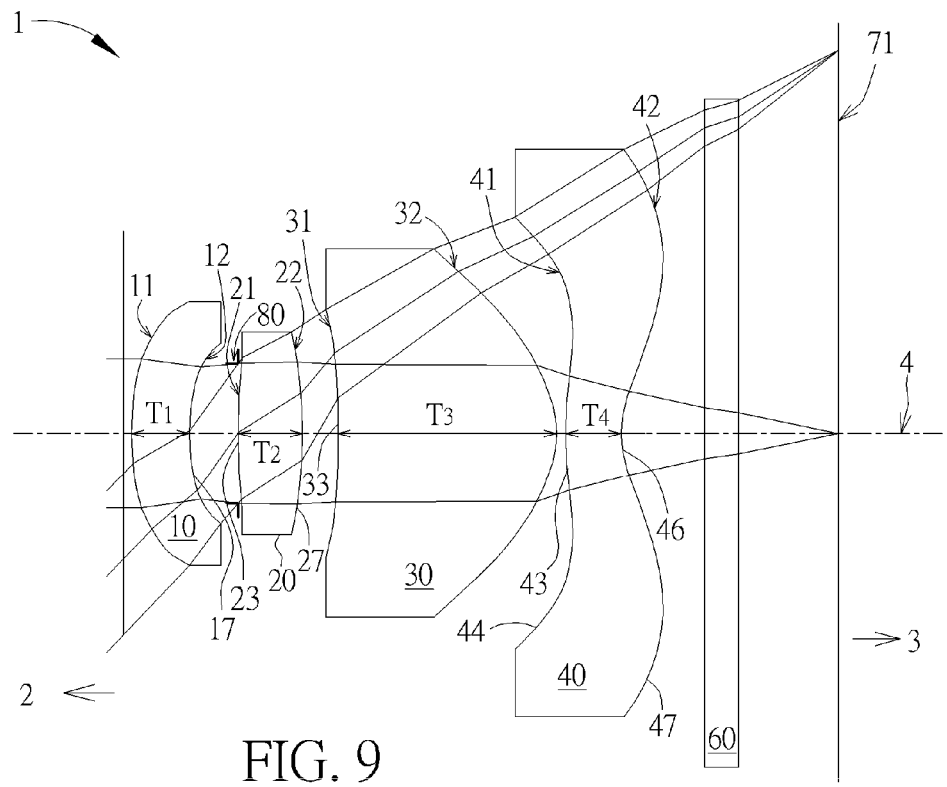
FIG. 9 illustrates a fifth example of the optical imaging lens set of four lens elements of the present invention.
Figures 10A, 10B, 10C, 10D:
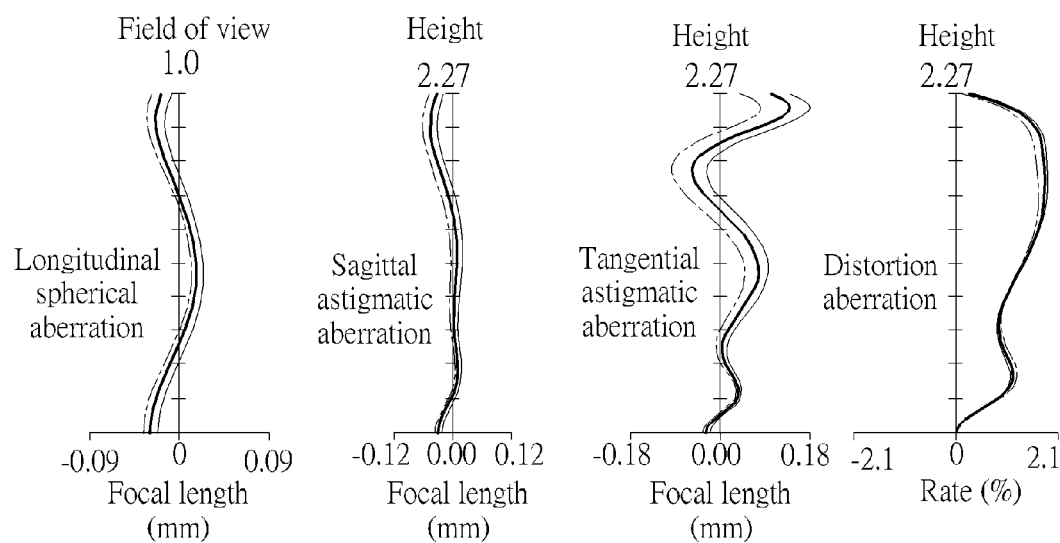
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example. The optical data of the fifth example of the optical imaging lens set are shown in FIG. 26 while the aspheric surface data are shown in FIG. 27. The length of the optical imaging lens set is 4.253 mm. The image height is 2.270 mm. Some important ratios of the fifth example are as follows:

$T_{all}$=2.383
$G_{aa}$=0.564
BFL=1.307
EFL=2.128
$G_{23}/(G_{12}+G_{34})$=0.627
$G_{23}/T_2$=0.569
$(BFL+T_3)/G_{12}$=8.823
$EFL/G_{23}$=9.785
$BFL/T_1$=3.728
$T_1/(G_{12}+G_{34})$=1.011
$(T_3+G_{23})/T_4$=4.525
$T_{all}/G_{aa}$=4.223
$(G_{23}+T_3)/T_2$=4.002
$BFL/G_{23}$=6.010
$T_3/G_{aa}$=2.325
$T_{all}/G_{23}$=10.958
$T_3/G_{23}$=6.034
$T_{all}/T_4$=7.049

SIXTH EXAMPLE

Figure 11:
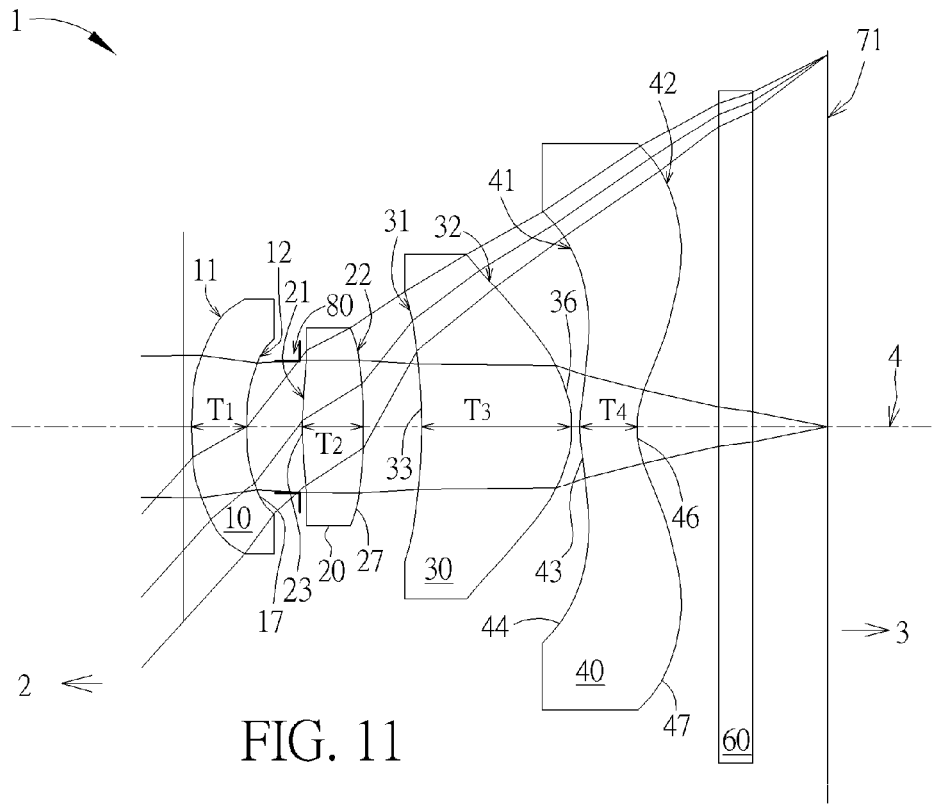
FIG. 11 illustrates a sixth example of the optical imaging lens set of four lens elements of the present invention.
Figures 12A, 12B, 12C, 12D:
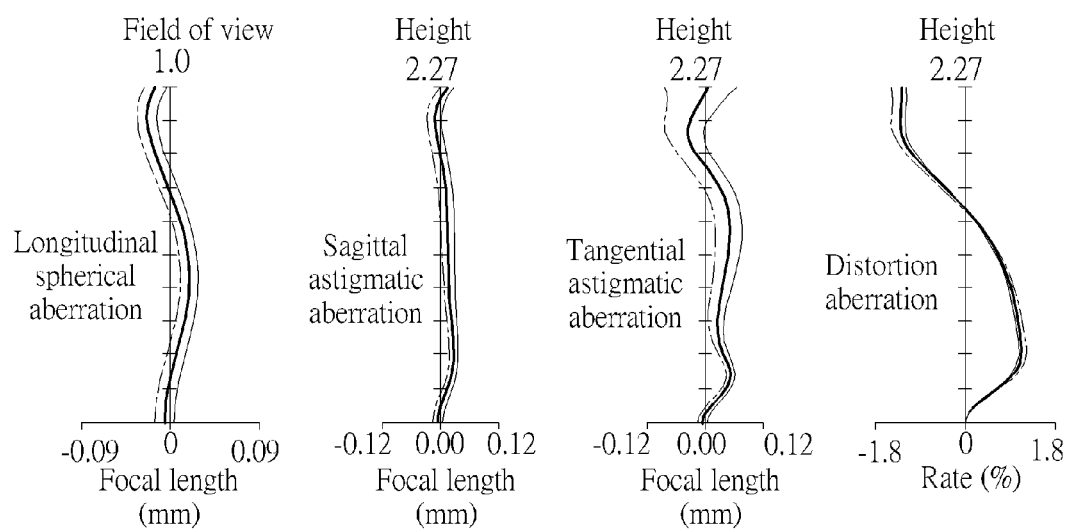
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example. The optical data of the sixth example of the optical imaging lens set are shown in FIG. 28 while the aspheric surface data are shown in FIG. 29. The length of the optical imaging lens set is 3.840 mm. The image height is 2.270 mm. Some important ratios of the sixth example are as follows:

$T_{all}=1.966$
$G_{aa}=0.706$
BFL=1.168
EFL=2.077
$G_{23}/(G_{12}+G_{34})=1.039$
$G_{23}/T_2=0.988$
$(BFL+T_3)/G_{12}=7.168$
$EFL/G_{23}=5.771$
$BFL/T_1=3.451$
$T_1/(G_{12}+G_{34})=0.976$
$(T_3+G_{23})/T_4=3.692$
$T_{all}/G_{aa}=2.782$
$(G_{23}+T_3)/T_2=3.508$
$BFL/G_{23}=3.244$
$T_3/G_{aa}=1.298$
$T_{all}/G_{23}=5.461$
$T_3/G_{23}=2.549$
$T_{all}/T_4=5.683$

SEVENTH EXAMPLE

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example. The optical data of the seventh example of the optical imaging lens set are shown in FIG. 30 while the aspheric surface data are shown in FIG. 31. The length of the optical imaging lens set is 4.003 mm. The image height is 2.270 mm. Some important ratios of the seventh example are as follows:

$T_{all}=2.365$
$G_{aa}=0.549$
BFL=1.090
EFL=1.921
$G_{23}/(G_{12}+G_{34})=0.573$
$G_{23}/T_2=0.548$
$(BFL+T_3)/G_{12}=9.210$
$EFL/G_{23}=9.605$
$BFL/T_1=3.019$
$T_1/(G_{12}+G_{34})=1.034$
$(T_3+G_{23})/T_4=4.080$
$T_{all}/G_{aa}=4.308$
$(G_{23}+T_3)/T_2=4.047$
$BFL/G_{23}=5.450$
$T_3/G_{aa}=2.326$
$T_{all}/G_{23}=11.825$
$T_3/G_{23}=6.385$
$T_{all}/T_4=6.533$ Some important ratios in each example are shown in FIG. 32.

The applicant summarized the efficacy of each embodiment mentioned above as following:

1. The first image-side surface has a concave part in a vicinity of its circular periphery, and the aperture stop is disposed between the first lens element and the second lens element, the arrangement helps to increase HFOV. Besides, the third lens element has positive refractive power, to provide the needed refractive power for the optical imaging lens set.

2. The first image-side surface has a concave part in a vicinity of its circular periphery; the second object-side surface has a convex part in the vicinity of the optical axis; the second image-side surface has a convex part in the vicinity of its circular periphery; the third object-side surface has a concave part in the vicinity of the optical axis; the third image-side surface has a convex part in the vicinity of the optical axis; the fourth image-side surface has a concave part in the vicinity of the optical axis and a convex part in the vicinity of its circular periphery, these lens elements are matched to each other, to ensure the image quality.

In summary, in the present invention, it can achieve excellent image quality by matching the designed lens element to each other.

In addition, the inventors discover that there are some better ratio ranges for different data according to the above various important ratios. Better ratio ranges help the designers to design the better optical performance and an effectively reduced length of a practically possible optical imaging lens set. For example:

(1) $T_1/(G_{12}+G_{34}) \leq 2.5$: Since the shape of the first lens element along the optical axis is not limited, so the thickness shorten range of the first lens element is larger, in addition, the aperture stop is disposed between the first lens element and the second lens element, so shorten range of $G_{12}$ is smaller. Besides, considering the light path, the shorten range of $G_{34}$ is smaller too. Therefore, $T_1/(G_{12}+G_{34}) \leq 2.5$ is preferably small, but ideally, it is suggested that the range may be 0.8~2.5.

(2) $(T_3+G_{23})/T_4$: Since the third lens element has positive refractive power, so the thickness shorten range of the third lens element is smaller, and considering the light path, $G_{23}$ needs to be large enough to allow the light can transmitted from the second lens element with smaller thickness along the optical axis to the third lens element with larger thickness along the optical axis, so $T_3$ and $G_{23}$ cannot be shrunk much, but the thickness shorten range of the fourth lens element is larger, so $(T_3+G_{23})/T_4$ is preferably large, but ideally, it is suggested that the range may be 3.5~4.7.

(3) $2.49 \leq T_{all}/G_{aa}$: Considering the difficulties in the manufacturing process, when the relationship is satisfied, $T_{all}$ and Gaa have better arrangement, ideally, it is suggested that the range may be 2.49~4.7.

(4) $2.5 \leq (G_{23}+T_3)/T_2$: Since the shorten range of $G_{23}$ and $T_3$ are smaller, and the second lens element has smaller thickness along the optical axis, so the thickness shorten range of the second lens element is larger, $2.5 \leq (G_{23}+T_3)/T_2$ is preferably large, but ideally, it is suggested that the range may be 2.5~5.5.

(5) $2.5 \leq BFL/G_{23}$: Since the filter and others components should be disposed between the fourth lens element and the image plane, so BFL cannot be shrunk unlimitedly. Considering the light path and the difficulties in the manufacturing process, when the relationship is satisfied, BFL and $G_{23}$ have better arrangement, so as to have shorter length and larger field of view, ideally, it is suggested that the range may be 2.5~6.3.

(6) $G_{23}/(G_{12}+G_{34}) \leq 1.5$: Considering the light path and the difficulties in the manufacturing process, when the relationship is satisfied, each air gaps have better arrangement, so as to have shorter length and larger field of view, ideally, it is suggested that the range may be 0.5~1.5.

(7) $0.54 \leq G_{23}/T_2$: Since $G_{23}$ needs to be large enough to allow the light to be transmitted from the second lens element with smaller thickness along the optical axis to the third lens element with larger thickness along the optical axis, $G_{23}$ cannot be shrunk much, and the second lens element has smaller thickness along the optical axis, so the thickness shorten range of the second lens element is larger, the relationship is suggested that the range may be 0.54~1.6.

(8) $7.00 \leq (BFL+T_3)/G_{12}$: Since the shorten ranges of BFL and $T_3$ are smaller, and compared with BFL and $T_3$, $G_{12}$ can be shrunk more, the relationship is suggested that the range may be 7.0~15.0.

(9) $3.7 \leq EFL/G_{23} \leq 10$: When EFL is shrunk, the field of view can be increased, however, EFL cannot be shrunk unlimitedly. When the relationship is satisfied, EFL and $G_{23}$ has better arrangement.

(10) $2.2 \leq BFL/T_1$: Since the filter and others components should be disposed between the fourth lens element and the image plane, so BFL cannot be shrunk unlimitedly, but the shape of the first lens element along the optical axis is not limited, so the thickness shorten range of the first lens element is larger, and the relationship is preferably large, but ideally, it is suggested that the range may be 2.2~5.0.

(11) $3.3 \leq T_{all}/G_{23}$: Considering the difficulties in the manufacturing process, $T_{all}$ cannot be shrunk unlimitedly, when the relationship is satisfied, $T_{all}$ and $G_{23}$ has better arrangement, so as to reduce the total length, ideally, it is suggested that the range may be 3.3~12.0.

(12) $2.5 \leq T_3/G_{23}$: Since the third lens element has positive refractive power, so T3 has larger thickness, and the thickness shorten range of the third lens element is smaller than the shorten range of $G_{23}$, ideally, it is suggested that the range may be 2.5~6.5.

(13) $1.25 \leq T_3/G_{aa}$: Since the third lens element has positive refractive power, so the thickness shorten range of the third lens element is smaller. In addition, when the total length of the optical imaging lens set is reduced, each air gaps are shrunk too, so the shorten range of Gaa is larger, ideally, it is suggested that the range may be 1.25~2.5.

(14) $5.00 \leq T_{all}/T_4$: In order to decrease the total length of the optical imaging lens set, all of the lens elements become thinner, and the thickness shorten range of the fourth lens element is larger. When the relationship is satisfied, ideally, it is suggested that the range may be 5~7.5.

Figure 16:
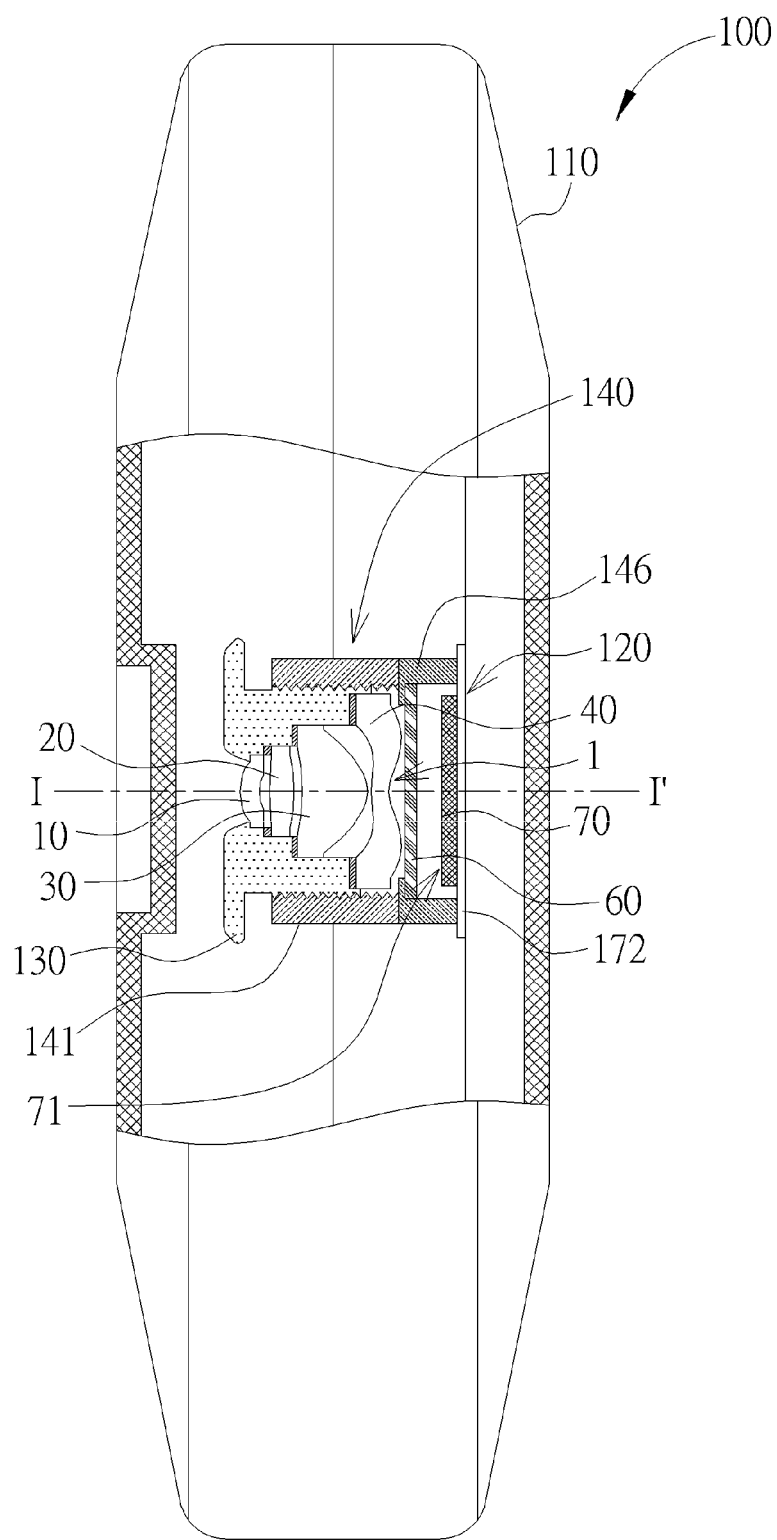
FIG. 16 illustrates a first preferred example of the portable electronic device with an optical imaging lens set of the present invention.

The optical imaging lens set 1 of the present invention may be applied to a portable electronic device. Please refer to FIG. 16. FIG. 16 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 16 as an example, but the portable electronic device 100 is not limited to a mobile phone.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 60 may be omitted in other examples although the optional filter 60 is present in this example. The case 110, the barrel 130, and/or the module housing unit 140 may be a single element or consist of a plurality of elements, but the present invention is not limited to this.

Each one of the four lens elements 10, 20, 30 and 40 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as about 3.8 mm, this ideal length allows the dimensions and the size of the portable electronic device 100 to be smaller and lighter, but excellent optical performance and image quality are still possible. In such away, the various examples of the present invention satisfy the need for economic benefits of using less raw materials in addition to satisfy the trend for a smaller and lighter product design and consumers' demands.

Figure 17:
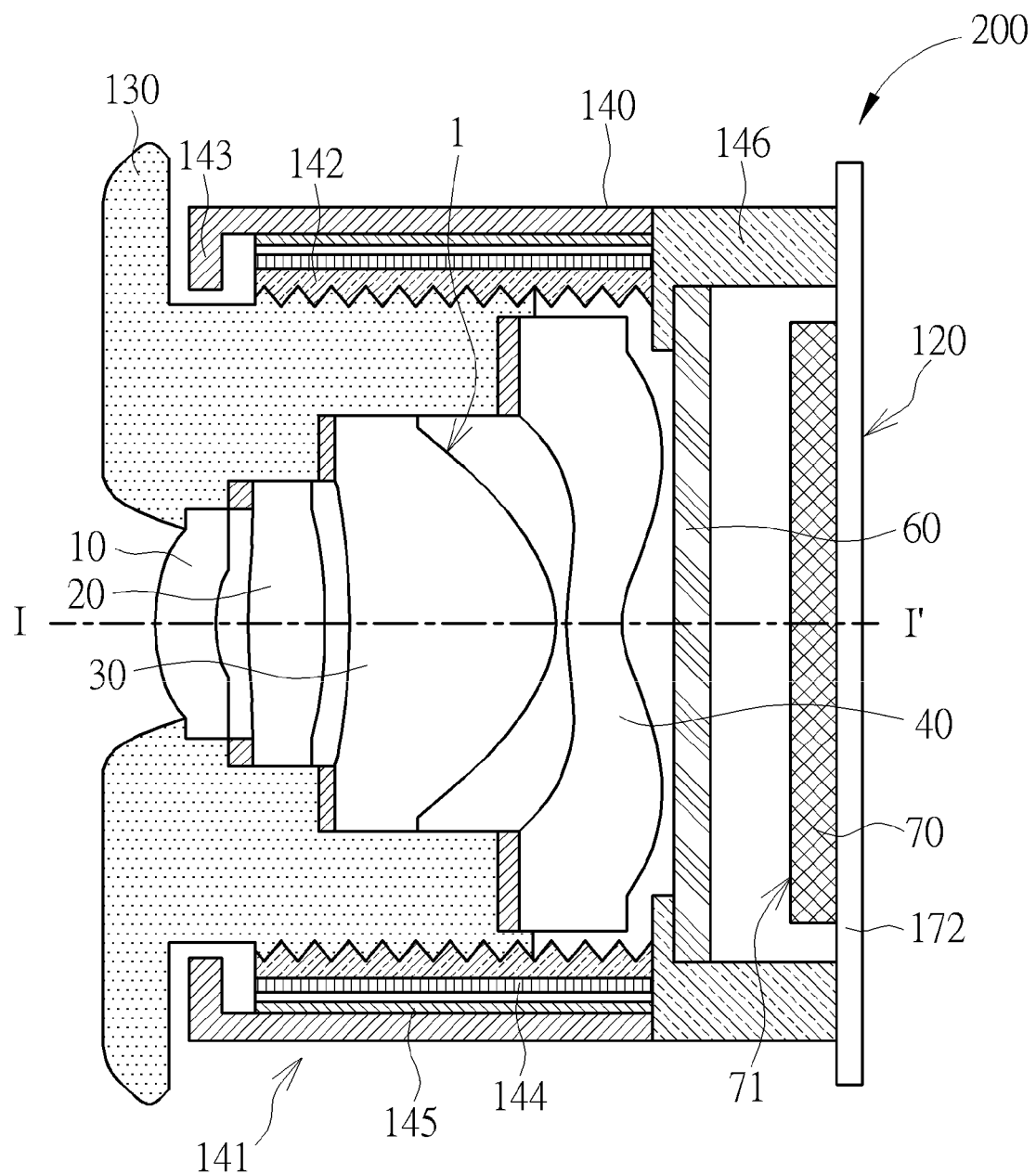
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 60, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, an aperture stop, a second lens element, a third lens element and a fourth lens element, said first to fourth lens elements having an object-side surface facing toward the object side as well as an image-side surface facing toward the image side, wherein:

the first lens element has an image-side surface with a concave part in a vicinity of its periphery;

the second lens element has an object-side surface with a convex part in a vicinity of the optical axis, and an image-side surface with a convex part in a vicinity of its periphery and a convex part in a vicinity of the optical axis;

the third lens element with positive refractive power, has an object-side surface with a concave part in a vicinity of the optical axis, and an image-side surface with a convex part in a vicinity of the optical axis;

the fourth lens element has an image-side surface with a concave part in a vicinity of the optical axis as well as a convex part in a vicinity of its periphery;

the optical imaging lens set does not include any lens element with refractive power other than said first lens element, second lens element, third lens element and fourth lens element, in addition, the sum of all three air gaps $G_{aa}$ between each lens elements from said first lens element to said fourth lens element along the optical axis, and a thickness $T_3$ of said third lens element along said optical axis satisfy a relationship $1.25 \leq (T_3/G_{aa})$.

2. The optical imaging lens set of claim 1, wherein a thickness $T_1$ of said first lens element along said optical axis, an air gap $G_{12}$ between said first lens element and said second lens element along said optical axis, and an air gap $G_{34}$ between said third lens element and said fourth lens element along said optical axis satisfy a relationship $T_1/(G_{12}+G_{34}) \leq 2.50$.

3. The optical imaging lens set of claim 1, wherein tan air gap $G_{12}$ between said first lens element and said second lens element along said optical axis, an air gap $G_{23}$ between said second lens element and said third lens element along said optical axis, and an air gap $G_{34}$ between said third lens element and said fourth lens element along said optical axis satisfy a relationship $G_{23}/(G_{12}+G_{34}) \leq 1.50$.

4. The optical imaging lens set of claim 1, wherein an air gap $G_{23}$ between said second lens element and said third lens element along said optical axis, and a total thickness $T_{all}$ of said first lens element, said second lens element, said third lens element and said fourth lens element along said optical axis satisfy a relationship $3.30 \leq (T_{all}/G_{23})$.

5. The optical imaging lens set of claim 1, wherein an air gap $G_{23}$ between said second lens element and said third lens element along said optical axis, a thickness $T_4$ of said fourth lens element along said optical axis satisfy a relationship $3.50 \leq (T_3+G_{23})/T_4$.

6. The optical imaging lens set of claim 1, wherein an air gap $G_{23}$ between said second lens element and said third lens element along said optical axis, and a thickness $T_2$ of said second lens element along said optical axis satisfy a relationship $0.54 \leq (G_{23}/T_2)$.

7. The optical imaging lens set of claim 1, wherein a thickness $T_4$ of said fourth lens element along said optical axis, and a total thickness $T_{all}$ of said first lens element, said second lens element, said third lens element and said fourth lens element along said optical axis satisfy a relationship $5.00 \leq (T_{all}/T_4)$.

8. An electronic device, comprising:
a case; and
an image module disposed in said case and comprising:
an optical imaging lens set of claim 1;
a barrel for the installation of said optical imaging lens set;
a module housing unit for the installation of said barrel;
a substrate for the installation of said module housing unit; and
an image sensor disposed on the substrate and disposed at an image side of said optical imaging lens set.

9. The optical imaging lens set of claim 2, wherein an air gap $G_{23}$ between said second lens element and said third lens element along said optical axis, a thickness $T_3$ and a thickness $T_4$ of said fourth lens element along said optical axis satisfy a relationship $3.50 \leq (T_3+G_{23})/T_4$.

10. The optical imaging lens set of claim 2, wherein an air gap $G_{23}$ between said second lens element and said third lens element along said optical axis, a thickness $T_2$ of said second lens element along said optical axis, and the thickness $T_3$ satisfy a relationship $2.5 \leq (G_{23}+T_3)/T_2$.

11. The optical imaging lens set of claim 3, wherein a thickness $T_2$ of said second lens element along said optical axis and the air gap $G_{23}$ satisfy a relationship $0.54 \leq (G_{23}/T_2)$.

12. The optical imaging lens set of claim 3, wherein an effective focal length EFL of the optical imaging lens set and the air gap $G_{23}$ satisfy a relationship $3.7 \leq (EFL/G_{23}) \leq 10.00$.

13. The optical imaging lens set of claim 4, wherein a thickness $T_2$ of said second lens element along said optical axis, and a thickness $T_3$ and the air gap $G_{23}$ satisfy a relationship $2.5 \leq (G_{23}+T_3)/T_2$.

14. The optical imaging lens set of claim 6, wherein an air gap $G_{23}$ between said second lens element and said third lens element along said optical axis, and a distance BFL between the image-inside surface of the fourth lens element to an image plane satisfy a relationship $2.50 \leq (BFL/G_{23})$.

15. The optical imaging lens set of claim 9, wherein a total thickness $T_{all}$ of said first lens element, said second lens element and said fourth lens element along said optical axis, and the sum of all three air gaps $G_{aa}$ satisfy a relationship $2.49 \leq (T_{all}/G_{aa})$.

16. The optical imaging lens set of claim 10, wherein a distance BFL between the image-side surface of the fourth lens element to an image plane and the air gap $G_{23}$ satisfy a relationship $2.5 \leq (BFL/G_{23})$.

17. The optical imaging lens set of claim 11, wherein a distance BFL between the image-side surface of the fourth lens element to an image plane, and the thickness $T_3$ satisfy a relationship $7.00 \leq (BFL+T_3)/G_{12}$.

18. The optical imaging lens set of claim 12, wherein a distance BFL between the image surface of the fourth lens element to an image plane, and a thickness $T_1$ of said first lens element along said optical axis satisfy a relationship $2.20 \leq (BFL/T_1)$.

19. The optical imaging lens set of claim 13, wherein the thickness $T_3$ and the air gap $G_{23}$ satisfy a relationship $2.50 \leq (T_3/G_{23})$.

* * * * *